Feb. 14, 1950          H. H. CURRY          2,497,114

INDUCTION GENERATOR

Original Filed Feb. 21, 1946          2 Sheets-Sheet 1

INVENTOR.
HERMAN H. CURRY

BY

ATTORNEY

Feb. 14, 1950          H. H. CURRY          2,497,114
INDUCTION GENERATOR

Original Filed Feb. 21, 1946          2 Sheets-Sheet 2

INVENTOR.
HERMAN H. CURRY
BY
*M. O. Hayes*
ATTORNEY

Patented Feb. 14, 1950

2,497,114

UNITED STATES PATENT OFFICE 2,497,114

INDUCTION GENERATOR

Herman H. Curry, Inverness, Fla.

Original application February 21, 1946, Serial No. 649,429. Divided and this application April 30, 1948, Serial No. 24,292

15 Claims. (Cl. 171—252)

(Granted under the act of March 3, 1883, as amended April 30, 1928; 370 O. G. 757)

This invention relates in general to an induction generator, and in particular to such a generator for high-speed operation.

The present application is a division of my copending application for Induction generator, Serial No. 649,429, filed February 21, 1946.

Until recently, there has been no great demand for high-speed units as a two-pole synchronous generator need operate at only 3600 R. P. M. to supply the standard 60 cycles per second frequency. In certain fields requiring higher frequencies, as in aviation art, wherein 400 cycles per second is standard, the only prime movers heretofore used have been reciprocating internal-combustion engines of limited speed, therefore necessitating multi-pole generators for direct drive to supply the requisite frequency. It has presently become desirable to provide a generator unit capable of direct drive from a high-speed prime mover, such as, a gas turbine or turbo compressor. Such a unit is extremely useful in connection with jet-propelled aircraft for supplying auxiliary power, which may be used, for example, for driving auxiliary propellers for added thrust at low altitudes and speeds, as described and claimed in my copending application, Serial No. 644,988, filed February 1, 1946, now abandoned, and for other power purposes requiring both a high speed and high frequency.

Gas turbines are inherently preferable of a very high speed in the smaller and moderate sizes and operate efficiently at speeds in the order of 25,000 R. P. M. Since a standard aviation frequency of 400 cycles per second allows an operating speed of some 24,500 R. P. M. for a two-pole induction generator, it is apparent that a direct drive between turbine and generator is possible providing an induction generator suitable for such high-speed operations is employed.

An object of the present invention, therefore, is to provide such an induction generator suitable for very high speeds of rotation.

Another object is to provide a novel stator element for such a generator, wherein the stator is laminated, having plastic bonding between the laminations, and cooling means around the periphery of the stator.

Another object is to provide an induction generator with a smooth all-iron rotor in combination with a skewed-slot stator.

Another object is to provide a novel means for cooling a generator.

Further objects and advantages of this invention, as well as its construction, arrangement and operation, will be apparent from the following description and claims in connection with the accompanying drawings, in which:

Figure 1:
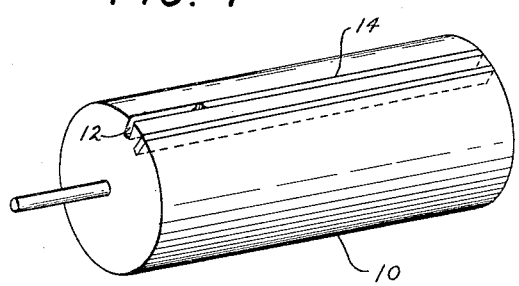
Fig. 1 is a diagrammatic illustration of an induction generator rotor embodying the principles of this invention.

Fig. 1 shows a rotor 10, preferably of solid construction of low-resistance iron rather than the conventional laminated iron copper construction, so as to provide a mechanically strong unit allowing high speeds of rotation. By use of a smooth solid unit, all of the rotor air-gap surface is made available as a magnetic path and some flux concentration due to the usual rotor slots is avoided. This effective use of rotor iron together with the use of a close air gap as described below reduces magnetizing current and the amount of leading exciting current required. All of the material in the solid rotor is also made available for secondary current thus tending to compensate by the added effective area for the greater specific resistance of the iron over copper.

While the increased inductance of such a rotor would be a serious disadvantage in a motor, reducing starting torque and pull out torque, these characteristics are not of such major importance in an induction generator operating at low normal slip frequency in rotor iron. Rotor losses from excitation current and iron losses at slip frequency will not be excessive and a smooth solid all iron rotor can be successfully utilized.

A smooth solid rotor, however, operating with conventional stator slots in a high-frequency generator may have excessive losses from slot-frequency harmonics, and due to the high frequency of these and to the inductance of a solid iron rotor, these losses will be confined largely to near the surface by skin effect.

In accordance with another embodiment of the present invention, to reduce these high-frequency losses, very narrow and shallow slots 12 are cut in the rotor surface parallel to the rotor axis. These slots 12 are filled by iron strips welded to the solid rotor iron at the ends, as at 14, and insulated from, but bonded to, the rotor iron except at the welded ends.

Figure 2:
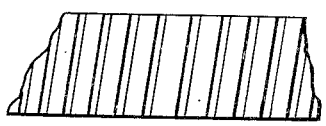
Fig. 2 is a fragmentary section of a skewed-slot stator for use in combination with the rotor of Fig. 1.

In accordance with a further part of this invention, it is proposed to use the rotor described above having either a smooth solid all-iron construction or having narrow welded strips, with a stator having closed or iron-wedged skewed slots, such as illustrated in Fig. 2. Alternatively, a stator can be used that has slots parallel to its axis in combination with a rotor having welded strips, such as described above, but in which the strips are skewed.

In order to reduce the magnetizing current of the rotor, and thus the leading excitation kva. (kilovolt amperes) required by the generator, it is proposed to reduce the air gap to a minimum. In a larger unit, normally cooled by radial ventilation and air flow through the air gap, the rotor heat is conducted to the ends and dissipated to the air by cooling fins or fan blades in a manner well-known to the art. In such a unit, the solid construction of the rotor is especially advantageous in that it provides good heat conduction longitudinally and heat is readily conducted to the ends where it can be dissipated.

Figure 3:
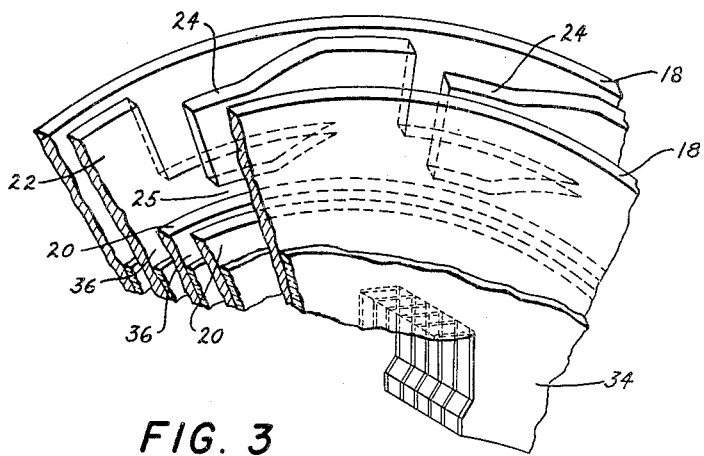
Fig. 3 is a fragmentary view showing the novel means for cooling the induction generator in accordance with this invention.
Figure 4:
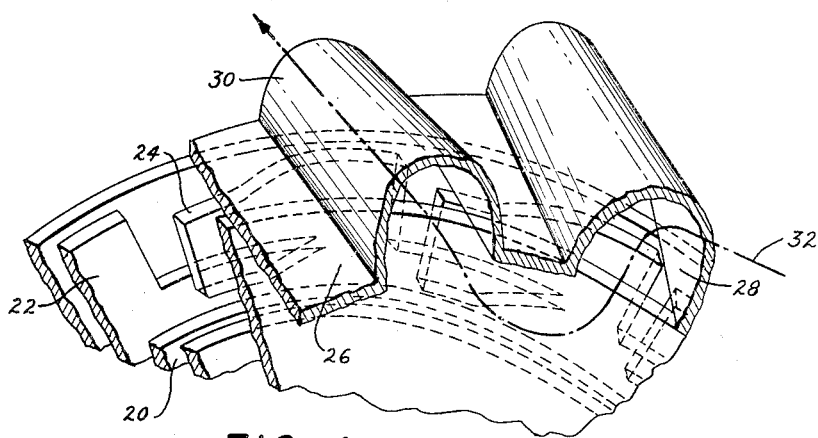
Fig. 4 is a fragmentary view showing a section as in Fig. 3 with covering means therefor.
Figure 5:
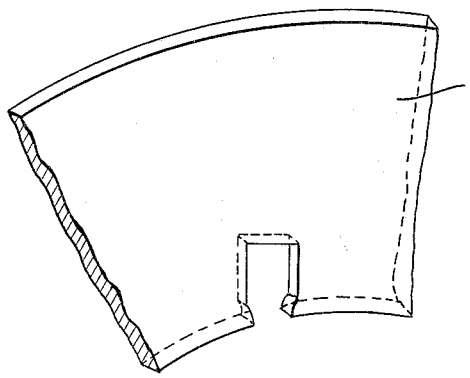
Fig. 5 is a fragmentary view showing one of the laminated sections of Fig. 3.
Figure 6:
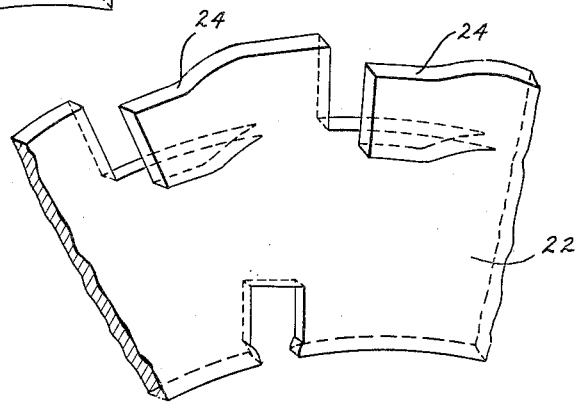
Fig. 6 is a fragmentary view showing the baffle construction of another of the laminated sections of Fig. 3.
Figure 7:
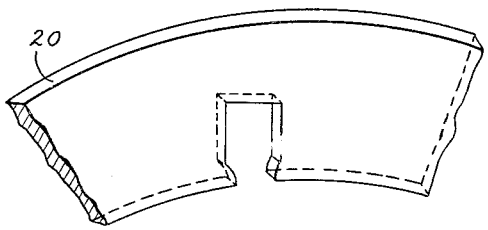
Fig. 7 is a fragmentary view showing still another of the laminated sections of Fig. 3.

In order to cool the stator a novel construction is proposed as shown in Figs. 3 through 7. In accordance with this feature of the invention, the stator laminations are so formed to give the result shown in exaggerated thickness in Figs. 3 and 4. Groups of two or more wide or radially deep laminations 18 (see Figs. 3–7, especially Fig. 3), shown separately in Fig. 5, are separated by one or more rings of narrow laminations 20, shown in detail in Fig. 7, and by a ring 22, having baffle sections 24, as shown in detail in Fig. 6, so bent as to lap over the narrow sections 20. A clearance is left between the bottom of the baffles 24 and the top of the sections 20, as at 25, so as to provide a passage for cooling fluid. The narrow laminations 20 are of such width as to provide an adequate flux path past the winding slot and to yet allow a cooling passage, as at 25, between the top of the section and the bottom of baffle 24. A plurality of such groups of laminations comprise the assembled stator element.

A cover section 26, Fig. 4, is placed around the periphery of the stator so that, when assembled, radial passages are formed for the circulation of a cooling fluid from intake ducts as 28, inward to near the windings beneath the baffles 24 then radially outward to an outlet duct as 30. The passage of the cooling fluid is shown by the dashed line 32 in Fig. 4. Forced circulation of oil or other cooling liquid as well as a gaseous cooling medium such as air or hydrogen through the cooling system is within the scope of this invention. In the embodiment shown in Fig. 4, every other one of the openings in the cover 26 can be used as intake ducts while the remaining ducts are used as outlets.

The elasticity of the bent laminations are depended upon to make only an approximately fluid-tight joint between the laminated sections 20 and baffles 24 forming the sides of the U-shaped passages. The laminations are elsewhere bonded together, at least near the winding slots and air gap, to make a fluid-tight assembly by any conventional method, such as by assembling under high pressure and temperature after coating with a thermo-setting plastic.

Optionally, the surfaces of the laminations can be bonded together for only a short distance above the winding slots and air gap as shown at 34 (Fig. 3) leaving a small clearance between laminations, as at 36, so as to allow the cooling fluid to penetrate between the laminations closer to the source of heat. By coating each lamination with a suitable thermo-setting plastic near the air gap and around the winding slot, and then heating the unit while assembled under axial pressure, a solid and rigid hum-free structure is obtained, heat conductivity between the laminations is increased, the cooling passages are sealed from the air gap, and the winding slots are electrically insulated by the plastic.

By means of the above-described cooling system, heat is effectively transferred to the cooling medium from the edge of each stator lamination as near to the source of heat as practically possible, and at the same time the novel construction allows a light compact construction.

Heat flow across the laminations is reduced by the division of the laminations into a plurality of peripheral channels through which the cooling fluid is circulated. The cooling fluid is circulated close to the air gap; however, no ventilating or cooling passages enter the air gap, thus the entire cylindrical surface of the stator at the air gap can be used for magnetic flux.

The intensive cooling allows a high power output per unit weight for a high-speed generator and is thus particularly suited to aviation purposes.

Modifications and changes can be made in the above-described embodiment of this invention without departing from the spirit and scope of this invention.

The invention described herein may be manufactured and used by or for the Government of the United States of America for governmental purposes without the payment of any royalties thereon or therefor.

What is claimed is:

1. In electrical apparatus, a stator element comprising a plurality of laminations, plastic bonding means near one end of said laminations only, the opposite ends being spaced to define passages therebetween, and cooling means around the periphery of said stator element for the passage of a cooling fluid through the passages and into contact with each of said laminations.

2. In electrical apparatus, a stator element comprising a plurality of laminations, plastic bonding means between each lamination adjacent the winding slots and air gap of said stator element only, the parts remote from said slots and air gap being spaced to define passageways, and cooling means around the periphery of said stator element for the passage of a cooling fluid into contact with the edges of said laminations and between said laminations above said plastic bonding means.

3. In electrical apparatus, a stator element comprising a plurality of wide laminations, at least one narrow lamination between each of said wide laminations, a lamination adjacent each of said wide laminations having a plurality of baffles overlapping said narrow laminations and extending to the next wide lamination whereby to form radial channels inward toward the windings of said stator element, and a cover member around the periphery of said stator element forming inlet and outlet ducts for the passage of a cooling fluid to said radial channels.

4. In a high-speed induction generator, an all-iron rotor element having narrow shallow surface laminations, a slotted stator element, the slots of said stator element being in skewed relationship with respect to the laminations of said rotor, a minimum air gap between said stator and rotor elements, said stator element comprising a plurality of wide laminations, at least one narrow lamination beteween each of said wide laminations whereby to form a series of channels around the periphery of said stator element, a lamination adjacent each of said wide laminations having a plurality of baffles overlapping said narrow laminations and extending to the next wide lamination whereby to form radial channels inward toward the windings of said stator element, and a cover member around the periphery of said stator element forming inlet and outlet ducts for the passage of a cooling fluid to said radial channels.

5. In electrical apparatus, a stator element comprising a plurality of interspersed wide and narrow laminations arranged to form channels around the periphery of said stator element for the passage of a cooling fluid, deflecting means on said wide laminations and overlying said narrow laminations for directing the flow of said cooling fluid between said laminations, and plastic bonding means between said laminations.

6. The apparatus as claimed in claim 5 wherein said plastic bonding means extends radially outward only a short distance from said winding slots and air gap, thereby to allow the cooling fluid to penetrate inward between said wide and narrow laminations.

7. A method of constructing a laminated stator element for electrical apparatus comprising coating the laminations of said stator element adjacent the air gap and winding slots only with a thermo-setting plastic, assembling said laminations, and heating the assembly under axial pressure whereby to bond said laminations together adjacent said air gap and winding slots only, and to provide cooling passages between said laminations above said bonded section.

8. A stator construction for electrical apparatus, comprising a frame having plurality of laminations, predetermined ones of said laminations having greater cross-sectional area and interposed among laminations of lesser cross-sectional area, the inner edges of said laminations being arranged to define a slotted wall of a rotor-stator air gap, bonding means between said laminations and extending only part way from said slotted wall toward the outer edges, thereby to provide spaces between adjacent elements at said outer edges for passing a coolant therethrough.

9. A stator construction for electrical apparatus, comprising a frame having plurality of annular laminations, predetermined ones of said laminations having greater radial dimension and interposed among laminations of lesser radial dimension, the inner edges of said laminations defining a slotted wall of a rotor-stator air gap, bonding means between said laminations and extending part way only from said slotted wall toward the outer edges thereof, whereby spaces are provided between adjacent laminations, and means for passing a coolant through said spaces.

10. A stator construction for electrical apparatus, comprising a frame having plurality of stacked annular laminations, predetermined ones of said laminations having greater radial dimension and interposed among laminations of lesser radial dimension, bonding means between said elements and extending part way only from the inner edges toward the outer edges thereof, whereby spaces are provided between adjacent elements at said outer edges, and means including a cover member at the outer edges of said laminations and having ducts communicable with said spaces for directing a coolant through said spaces.

11. The stator construction as in claim 10 wherein said directing means further comprises offset portions on selected ones of said laminations of greater radial dimension adapted to deflect a stream of coolant toward said laminations of lesser radial dimension.

12. In a high-speed induction generator, a rotor element having surface laminations, a slotted stator element, the slots of said stator element being in skewed relationship with respect to the laminations of said rotor, said stator element comprising a plurality of wide laminations, at least one narrow lamination between each of said wide laminations whereby to form a series of channels around the periphery of said stator element, and a lamination adjacent each of said wide laminations having a plurality of baffles overlapping said narrow laminations and extending to the next wide lamination whereby to form radial channels inward toward the windings of said stator element.

13. In a high-speed induction generator, a rotor element having surface laminations, a slotted stator element, the slots of said stator element being in skewed relationship with respect to the laminations of said rotor, said stator element comprising a plurality of wide laminations, at least one narrow lamination between each of said wide laminations whereby to form a series of channels around the periphery of said stator element, and a lamination adjacent each of said wide laminations having a plurality of baffles overlapping said narrow laminations and extending to the next wide lamination whereby to form radial channels inward toward the windings of said stator element, and a cover member around the periphery of said stator element having inlet and outlet ducts for the passage of a cooling fluid to said radial channels.

14. In electrical apparatus, a stator element comprising a plurality of wide laminations, at least one narrow lamination between each of said wide laminations, and a lamination adjacent each of said wide laminations having a plurality of baffles overlapping said narrow laminations and extending to the next wide lamination whereby to form radial channels inward toward the windings of said stator element.

15. In electrical apparatus, a stator element comprising a plurality of wide laminations, at least one narrow lamination between each of said wide laminations, a lamination adjacent each of said wide laminations having a plurality of baffles overlapping said narrow laminations and extending to the next wide lamination whereby to form radial channels inward toward the windings of said stator element, and means passing a coolant through said radial channels.

HERMAN H. CURRY.

REFERENCES CITED

The following references are of record in the file of this patent:

UNITED STATES PATENTS

| Number | Name | Date |
|---|---|---|
| 2,057,503 | Sawyer | Oct. 13, 1936 |

FOREIGN PATENTS

| Number | Country | Date |
|---|---|---|
| 48,361 | Austria | Apr. 10, 1912 |